United States Patent [19]

Belloc et al.

[11] Patent Number: 5,038,365
[45] Date of Patent: Aug. 6, 1991

[54] MODEM HAVING A SOFTWARE-ADAPTED MODULATION RATE

[75] Inventors: Jacques Belloc, Antibes; Daniel Pilost; Michel Quintin, both of La Gaude, France

[73] Assignee: International Business Machines Corporation, Armonk, N.Y.

[21] Appl. No.: 458,271

[22] Filed: Dec. 28, 1989

[30] Foreign Application Priority Data

Jan. 10, 1989 [EP] European Pat. Off. ........ 89480004.4

[51] Int. Cl.$^5$ ............................................. H04L 29/12
[52] U.S. Cl. ........................................... 375/8; 341/61; 370/84; 375/122
[58] Field of Search ............. 375/7, 8, 121, 122; 370/84; 371/5.5; 381/31, 32; 379/93, 97; 341/61; 364/724.1

[56] References Cited

U.S. PATENT DOCUMENTS

| | | | |
|---|---|---|---|
| 4,394,641 | 7/1983 | Artigalas | 341/61 |
| 4,748,625 | 5/1988 | Krause et al. | 371/5.5 |
| 4,837,571 | 6/1989 | Lutz | 341/61 |

FOREIGN PATENT DOCUMENTS 0285413  5/1988  European Pat. Off. .

OTHER PUBLICATIONS

IEEE Transactions on Consumer Electronics, vol. CE-31, No. 3, Aug. 1985, pp. 560-566, IEEE, New York, U.S.; R. Chirayil et al: "Modem IC Supports Three 1200 BPS Standards".

Fujitsu Scientific & Technical Journal, vol. 23, No. 4, Dec. 1987, pp. 309-318, Kawasaki, JP; N. Fujimura et al: "Voiceband Data Modems".

Primary Examiner—Benedict V. Safourek
Attorney, Agent, or Firm—Edward H. Duffield

[57] ABSTRACT

Modem receiving from/transmitting to a DTE data bits at a rate DR and adapted for operating at a modulation rate MR in an environment operating at a basic rate BR. In the receiving way, it comprises a first means for converting a number X of samples received at a frequency FS into a number X times MR/BR of samples before processing these samples by the signal processor whereby the processing results in DR/BR words of DR/MR bits, and second means for converting the DR/BR words into DR/MR words of DR/BR bits to be transmitted to the DTE. For the transmitting way the first and second converting means, are the same means but run in the reverse order. The result is that such an adapted modem behaves as a modem operating at a modulation rate MR on a periodic process interval of DR/(BR times MR) seconds.

7 Claims, 6 Drawing Sheets

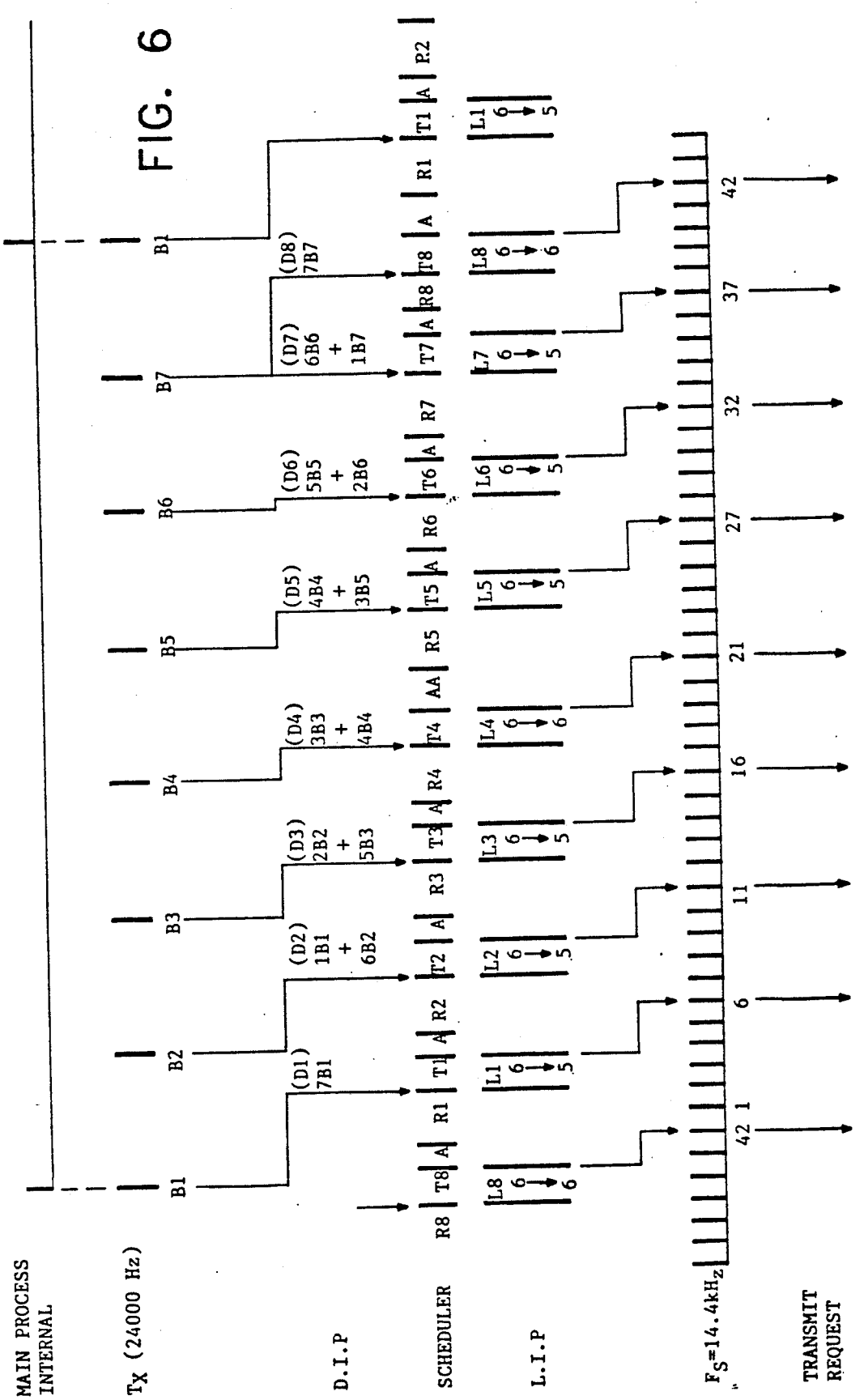

MODEM HAVING A SOFTWARE-ADAPTED MODULATION RATE

FIELD OF INVENTION

The invention relates to modems and particularly to a modem adapted for operating at a modulation rate which is different from the basic rate used by the environment wherein the modem operates.

PRIOR ART

In the transmission of data between a first data terminal equipment (DTE) and a second DTE over telephone lines, each DTE is equipped with a modem wherein the carrier signal is modulated by the data in a modulator at the sending end and demodulated in a demodulator at the receiving end. Where the transmission takes place between a plurality of local DTEs and a plurality of remote DTEs, a multiplexer enables a single modem to be connected to the plurality of DTEs that receive or transmit data on a time-multiplex basis. That is, each data byte sent to or received from the local DTE is formed by juxtaposing groups of bits received from or sent to each remote DTE, with the number of bits in each group being dependent on the transmission speed assigned to the corresponding DTE.

The data bit stream received at the input of the modem from the single DTE, or from several DTEs in case of multiplexing, is loaded in a serializer/deserializer which provides parallel groups of bits, the number of bits in each group depending on the data bit rate of the modem. Each group is represented by a point in a phase-amplitude diagram, all the points of the diagram forming a constellation. Each point is then translated into a couple of values corresponding to the coordinates of the point. Then, these two quadrature signal values are modulated by a carrier signal before being spectrally shaped in a filter centered at the carrier frequency providing as an output a number of samples of the shaped signal each baud time, complying with the sampling theorem. At last, the samples are provided to the digital-to-analog converter in order to be converted into an analog signal to be sent over the telephone line.

Reciprocally, on the other direction, the analog signal received from the telephone line is first converted into digital samples. The samples are filtered, and the output of the filter representing two in-phase and quadrature components, are used to provide a point in the plane corresponding to a group of bits. The juxtaposed groups of bits are then serially transmitted to the DTE or distributed to the different DTEs in case of multiplexing.

Due to the compliance with the CCITT recommendations, the today modems use a modulation rate of 2400 bauds resulting in data bit rates which are multiple of 2400 such as 2400, 4800, 9600, 14400 bps. With data bit rates of 14400 and higher than 14400 (e.g. 19200), the signal to noise ratio has been improved by using the technique called "Trellis Coded Modulation" (TCM). Though the number of points in the constellation is doubled in TCM, the improvement results in a signal to noise ratio which is increased of 3 dB. However, with a high data bit rate such as 19 200 bps, keeping a modulation rate of 2400 bauds leads to a constellation of 512 points too complex to be easily processed. The solution would be to widen the bandwidth. Unfortunately the available telephone line bandwidth is limited to about 3000 Hz, which means that only a bandwidth of a maximum of about 2900 Hz is possible if a good performance transmission without line distorsions is required.

The conventional solution to handle this problem consists in changing the hardware to adapt the sampling frequencies and the DTE interface mechanism. However, the latter mechanism needs buffers if the number of modulation periods from the DTE is not an integer, and two different mechanisms and timings must be available if two different modulation rates are used simultaneously in each direction.

Furthermore, it is highly desirable that, in order to have a higher integration and a reduced cost, such a new type of modems can be processed in the signal processor with the same external hardware and without change of the main signal processing routines.

OBJECT OF INVENTION

Therefore, the object of the invention is a modem adapted for operating at a modulation rate MR in an environment operating at a basic rate BR, comprising an analog-to-digital converter for converting the analog signals received over a telephone line into digital PCM samples at a frequency FS which is a multiple of the basic rate BR, a signal processor for processing the PCM samples and providing data bits, a serializer-deserializer for receiving parallel data bit words from a signal processor and providing a serial data bit stream to be transmitted at a data rate DR to a Data Terminal Equipment (DTE), and an adapter which interrupts the signal processor at each sampling pulse at the frequency FS so that the signal processor runs an interrupt program in charge of receiving each PCM sample from the analog-to-digital converter and transmitting a data bit word to the DTE. The signal processor comprises also first means for converting a number X of samples received at the frequency FS into a number X times MR/BR of samples before processing the samples by the signal processor whereby the processing results in DR/BR words of DR/MR bits, and second means for converting the DR/BR words of DR/MR bits into DR/MR words of DR/BR bits to be transmitted to the DTE, whereby the adapted modem behaves as a modem operating at a modulation rate MR on a periodic process interval of DR/(BR×MR) seconds.

Another object of the invention is a modem adapted for operating at a modulation rate MR in an environment operating at a basic rate BR, comprising a serializer/deserializer for receiving a serial bit stream at a data rate DR from a Data Terminal Equipment (DTE) and providing parallel data bit words, a signal processor for processing the data bit words and providing PCM samples, a digital-to-analog converter for converting the PCM samples received at a frequency FS into analog signals to be transmitted over a telephone line, and an adapter which interrupts the signal processor at each sampling pulse at the frequency FS so that the signal processor runs an interrupt program in charge of transmitting each PCM sample to the digital-to-analog converter and receiving a data bit word to the DTE. The signal processor further comprises first means for converting DR/MR words of DR/BR bits into DR/BR words of DR/MR bits, to be processed by the signal processor, and second means for converting X times DR/BR samples provided by the signal processor into X times DR/MR samples to be sent to the digital-to-analog converter, whereby the adapted modem behaves as a modem operating at a modulation rate MR on a periodic process interval of DR/(BR×MR) seconds.

BRIEF DESCRIPTION OF DRAWINGS

The invention will be more fully ascertained from the following description when read in conjunction with the accompanying drawings wherein:

FIG. 6 is a timing diagram showing, for the transmitting way, the operation of the different programs run in the signal processor of the modem, in a preferred embodiment of the present invention.

DESCRIPTION OF PREFERRED EMBODIMENT

For a sake of illustration of the invention, the embodiment which is described hereafter, relates to a modem operating normally at a basic modulation rate (BR) of 2400 bauds, for transmitting to/receiving from a DTE data bits at a bit rate of 19200 bits/s. This modem is adapted according to the invention to operate at a modulation rate (MR) of 2743 bauds which corresponds to 7 bits transmitted or received each modulation interval.

Figure 1:
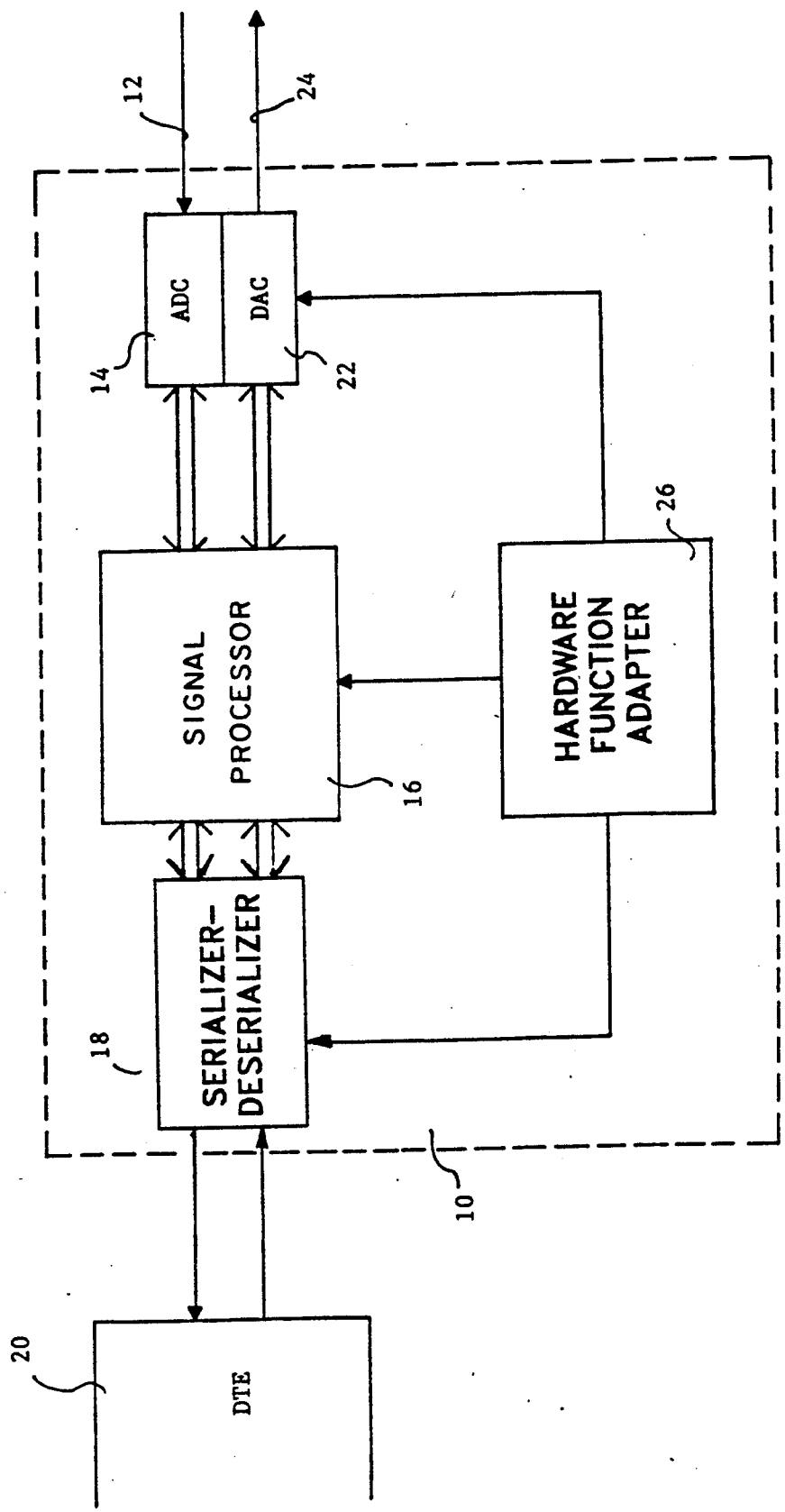
FIG. 1 represents a schematic of the main functional units of the modem according to the present invention.

FIG. 1 shows the different functions included in the modem 10, useful to understand the invention. Analog signals received from telephone line 12 are first converted by analog-to-digital (ADC) converter 14 into PCM digital samples which are provided at a sampling frequency FS to signal processor 16. The sampling frequency FS is such that it meets the Nyquist sampling theorem. In the present embodiment, FS has been chosen equal to 14400 Hz resulting in 6 samples taken each basic interval of 1/2400 seconds. After processing of these samples by signal processor 16, data bits are provided in parallel by the signal processor to a serializer/deserializer 18 which provides a serial bit stream to DTE 20. It must be mentioned that, in case of multiplexing of the data between several DTEs, a multiplexing mechanism enables the data bits to be distributed to the different DTEs, the number of bits for each DTE depending upon the data bit rate assigned to this DTE.

Reciprocally, the serial bit stream received from the DTE 20 is first deserialized in serializer/deserializer 18. Then, bits are provided in parallel to the signal processor 16 at each modulation interval. After processing by signal processor 16, PCM digital samples of the signal to be transmitted, are converted by digital-to-analog (DAC) converter 22 into an analog signal which is transmitted over telephone line 24.

All the hardware functions of the modem such as serializing/deserializing or ADC and DAC conversions are controlled by adapted 26, which also includes clock generation enabling all the modem functions to be clocked. Thus, adapter 26 interrupts signal processor 16 at each sampling pulse, (at a frequency of 14400 Hz in the present embodiment) for running an interrupt program. The latter program reads or writes data words from/to serializer/deserializer 18, and posts a transmit/receive program request to the general scheduler of signal processor 16.

Figure 2:
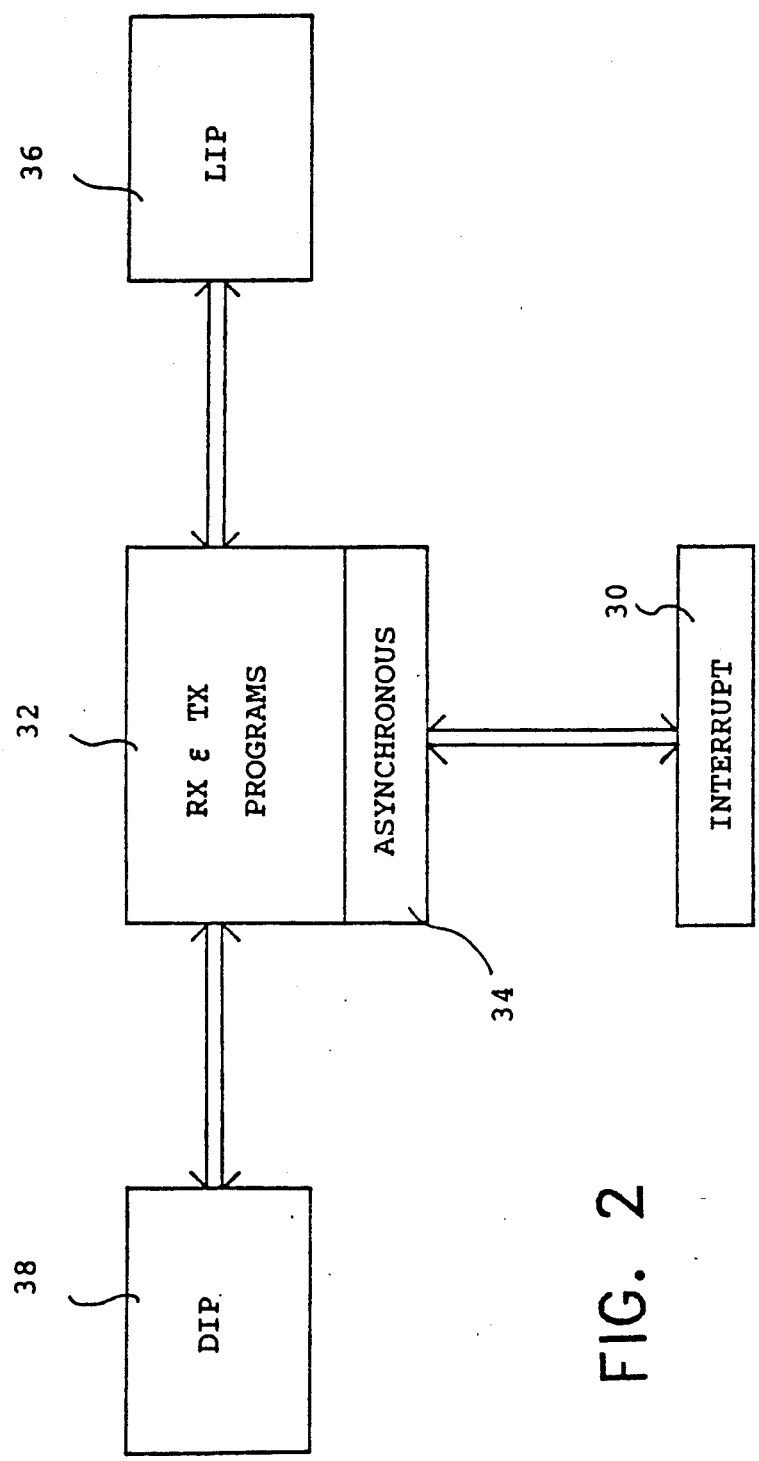
FIG. 2 represents a diagram showing the relations between the programs run in the modem of the invention.

In reference to FIG. 2, the programs run by the modem are, further to the interrupt program, signal processing transmit (TX) and receive (RX) program 32, asynchronous programs 34, Line Interface Program LIP 36 and DTE Interface Program DIP 38. The general scheduler (not shown) gives the control to the Transmit or Receive program according to the Transmit or Receive requests it receives from the Interrupt program. Transmit and Receive programs 32 are in charge of the signal processing such as equalization, filtering, modulation . . . . When there is no request pending, Asynchronous programs 34 are run.

The essential features of the present invention are provided by Line Interface program LIP 36, and DTE Interface program DIP 38. As already mentioned, data bits are transmitted to or received from the DTE(s) at a serial data rate of 19200 bits/second corresponding to 8 bits each basic interval 1/2400 seconds. But, the modem is now adapted to operate at a modulation rate of 2743 bauds which results in 7 bits transmitted or received each modulation interval 1/2743 seconds. The function of program DIP is therefore to convert the groups of 7 bits per modulation into (receive way of transmission) or from (transmit way of transmission) the groups of 8 bits per basic interval. To handle this task, DIP program must spread over a main process interval which is the lowest common multiple of both basic and modulation intervals. Such interval TP is:

$$TP = \frac{8}{2743} \text{ seconds} = \frac{7}{2400} \text{ seconds} = \frac{8 \times 7}{19200} \text{ seconds}$$

Therefore, each main process interval, 7 packets of 8 bits received/transmitted within 7 basic intervals (1/2400 seconds) from/to the DTE(s) by means of serializer/deserializer 18 (FIG. 1), are converted into/result from 8 packets of 7 bits within 8 modulation intervals (1/2743 seconds), by running the DIP program.

Within the main process interval divided into 7 basic intervals, 42 digital samples are received from/transmitted to analog-to-digital converter 14/digital-to-analog converter 22 (FIG. 1). To meet the modulation interval of the modem which is now 1/2743 seconds, the function of the LIP program is to convert these 42 samples into 48 samples corresponding to 6 samples for each of the 8 modulation intervals, and reciprocally. This operation of LIP program, performed by interpolation, consists in converting r input samples each modulation interval into 6 new samples (and reciprocally) regularly spaced in the modulation interval, according to the following sequence:

| | |
|---|---|
| $L_1 ==> r = 6$ | $L_5 ==> r = 6$ |
| $L_2 ==> r = 5$ | $L_6 ==> r = 5$ |
| $L_3 ==> r = 5$ | $L_7 ==> r = 5$ |
| $L_4 ==> r = 5$ | $L_8 ==> r = 5$ |

Such an interpolation can be performed by using the teachings described in European patent application No. 88480021.0 entitled "Improvement to digital filter sampling rate conversion method and device".

Again, it must be noted that the timings of the operations such as the PCM sampling and posting of transmit/receive program request, which initiate the running of the LIP and DIP programs, are hardware generated by a single clock in the modem adapter.

The invention will now be described in reference to the flow diagram of FIG. 3 in combination with the timing diagram of FIG. 4 as far as the receiving way is concerned. As already mentioned, the modem adapter posts an adapter request (40) every 1/14400 s. When initiated by this request, the interrupt program (42) reads the PCM samples received from the A to D converter. At this time, a check is made on the number of samples which have been received (44). If the number Li corresponds to the number which is necessary, as explained above, to compute 6 samples by interpolation, the Line Interface Program is run (46) in the same time a receive request is posted to the general scheduler, as shown on FIG. 4. If not, the check is repeated at the next modem adapter request.

Then, the receive program Rx is run (48) for all the operations which convert 6 PCM samples into a group of 7 data bits, each modulation interval of 1/2743 s. It must be noted that, as shown on FIG. 4, the running of program Rx (indicated by $R_1, R_2, \ldots$) can occur either before, or after the running of program Tx (indicated by $T_1, T_2, \ldots$) depending upon the occurrence of the corresponding request, the asynchronous programs (indicated by A) being run only in the absence of transmit or receive requests.

Figure 3:
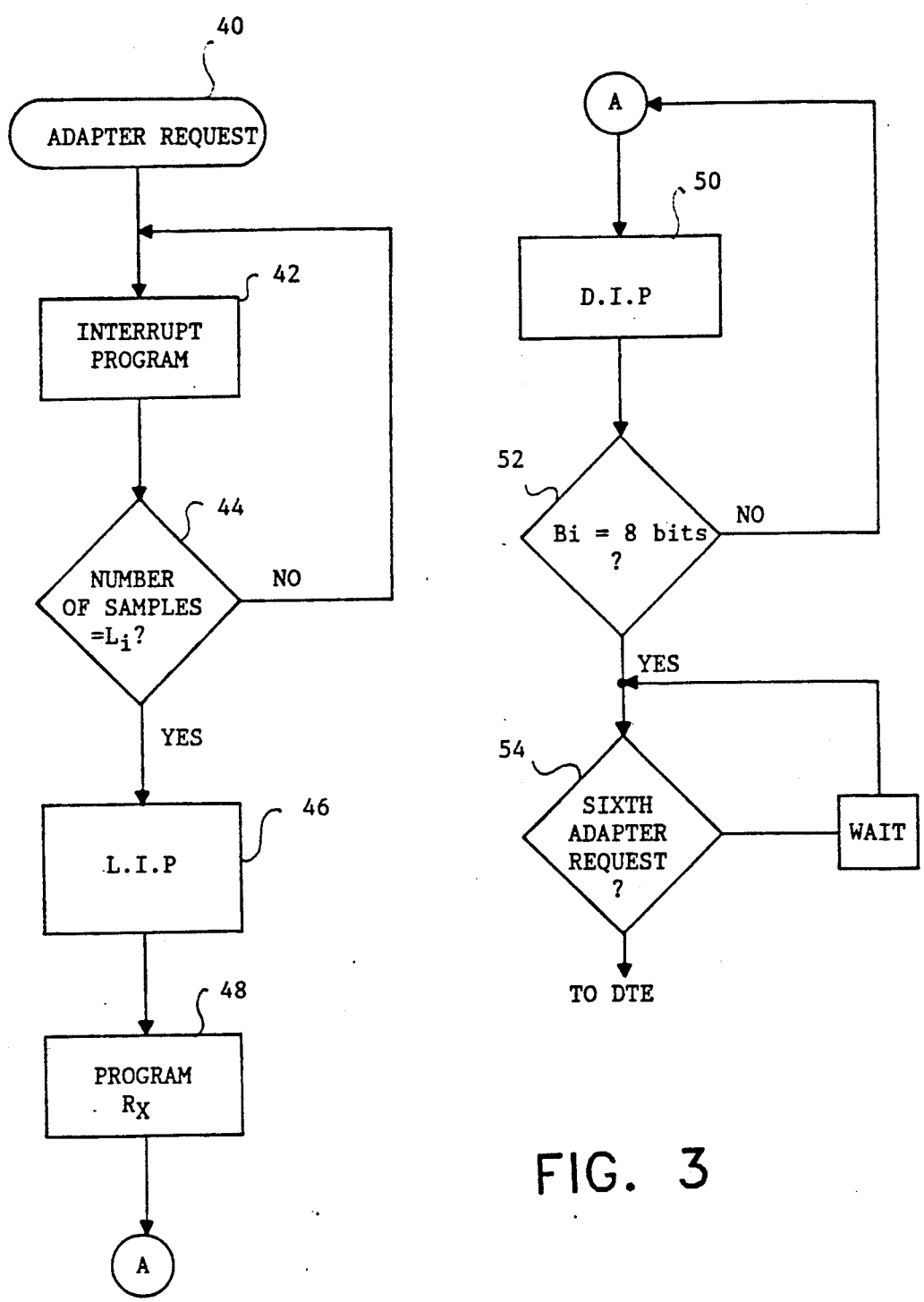
FIG. 3 is a flow diagram showing, for the receiving way, the different steps run in the signal processor of the modem.

In reference to the second part of FIG. 3 beginning at circled A, the DTE Interface Program is run (50), when it receives the groups of 7 bits (indicated $D_1, D_2, \ldots$) as a result of the program Rx running. The operation of program DIP is to accumulate groups B of 8 bits to be sent to the DTE as shown on FIG. 4. This is shown on the flow diagram by checking whether Bi is equal to 8 bits (52). If yes, the group of 8 bits is queued to be transmitted to the DTE at the frequency of 2400 Hz corresponding to a group B being sent each sixth adapter request only (54).

Figure 4:
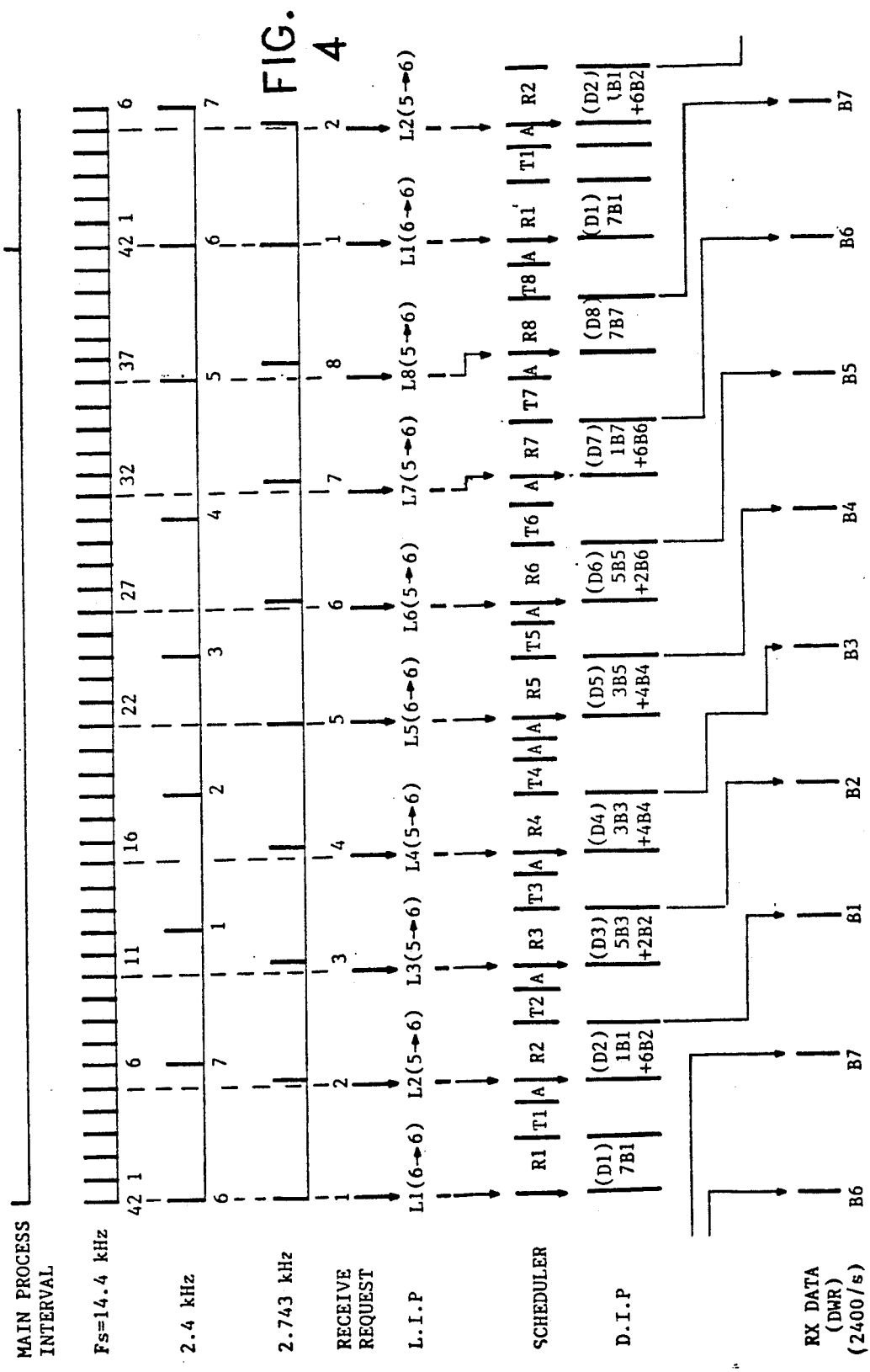
FIG. 4 is a timing diagram showing, for the receiving way, the operation of the different programs run in the signal processor of the modem in a preferred embodiment according to the present invention.

Though for the need of the description, the programs LIP and DIP have been separated from the program Rx, in fact they are run within the same time intervals referenced $R_1, R_2, \ldots$ in the scheduler timing of FIG. 4.

It should be recalled that, as shown on FIG. 4, 42 adapter requests are received within a main process interval corresponding to 7 basic intervals at 2400 bauds during which 1) 42 PCM samples (divided in 7 groups of 6 samples) are received from the A to D converter and 2) 56 bits (divided in 7 groups of 8 bits) are transmitted to the DTE. Accordingly, the modulation rate of 2743 bauds is totally ignored by the modem adapter which only knows the sampling frequency of 14400 Hz, and the data word transmission rate to the DTE which is 2400 Hz.

Figure 5:
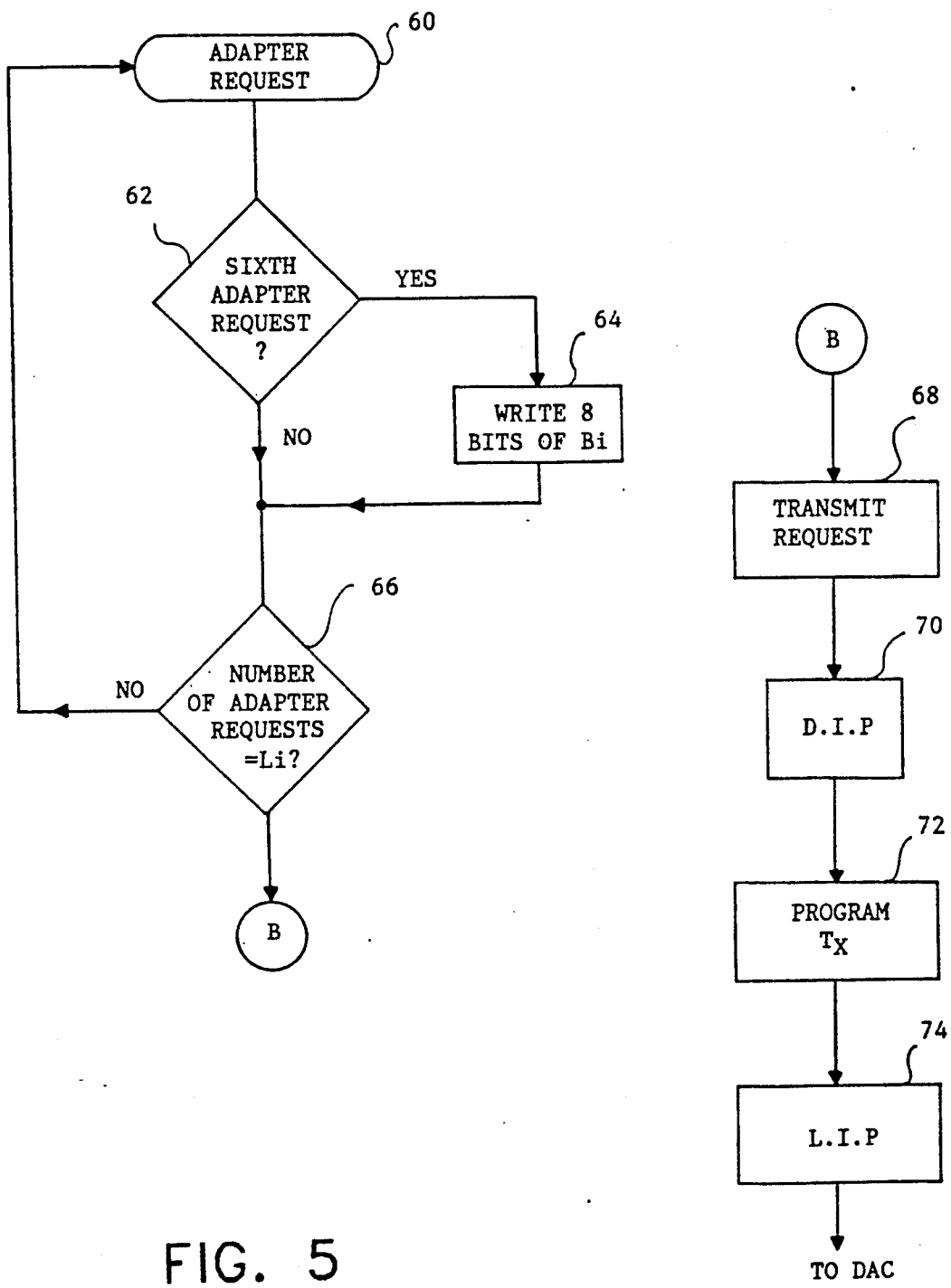
FIG. 5 is a flow diagram showing, for the transmitting way, the different steps run in the signal processor of the modem.

The transmitting way of transmission, that is from the DTE to the line, will now be described in reference to the flow diagram of FIG. 5 in combination with the timing diagram of FIG. 6. First of all, the modem adapter posts an adapter request (60) every 1/14400 seconds. When initiated by this request the interrupt program checks (62) whether it is the sixth adapter request after the preceding writing of data bits. If it is, a group B of 8 bits from the DTE is written (64) into the memory of the signal processor. After this step, or if it is not the sixth adapter request, the number of adapter requests received since the last transmit request is checked (66) to determine whether this number is equal to the number Li of samples which has been delivered by program LIP in answer to the preceding transmit request. If yes, a transmit request is posted (68) to the general scheduler. As shown on FIG. 6, if the transmit request occurs when one program R is running, it has to wait for the completion of R before being served.

As soon as the transmit request has been taken into account by the scheduler, program DIP is run (70) to convert data bits received as groups B of 8 bits into a group Di of 7 bits to be processed by the signal processor according to the following sequence.

$D_1 = 7$ bits $B_1$ $D_2 = 1$ bit $B_1 + 6$ bits $B_2$ $D_3 = 2$ bits $B_2 + 5$ bits $B_3$ $D_4 = 3$ bits $B_3 + 4$ bits $B_4$ $D_5 = 4$ bits $B_4 + 3$ bits $B_5$ $D_6 = 5$ bits $B_5 + 2$ bits $B_6$ $D_7 = 6$ bits $B_6 + 1$ bit $B_7$ $D_8 = 7$ bits $B_7$ Then, the transmit program (Tx) is run (72) for all the operations which convert a group of 7 data bits into 6 PCM samples, each modulation interval of 1/2743 seconds. As shown on FIG. 6 by reference $L_r$, these 6 samples are converted (74) by program LIP into r samples according to the sequence already mentioned for data reception. Thus, the program LIP is converts groups of 6 samples into groups of 5 or 6 samples, so that 48 samples received within 8 modulation intervals (with a modulation rate of 2743 bauds) are converted into 42 samples within 7 basic intervals (at 2400 bauds), transmitted to the digital-to-analog converter.

To summarize the transmitting operation, 42 adapter request are received within a main process interval corresponding to 7 basic intervals at 2400 bauds during which (1) 56 bits (divided in 7 groups of 8 bits) are received from the DTE, and (2) 42 PCM samples (divided in 7 groups of 6 samples) are transmitted to the D to A converter.

Though, in the above embodiment, the transmit and receive modulation rates are equal, that is 2743 bauds, they can be different. For instance, it will be the case for a tributary modem which receives 19200 bits/seconds from the control modem at a modulation rate of 2743 bauds (7 bits per baud) and transmits only 9600 bits/seconds at a modulation rate of 2400 bauds (4 bits per baud). In such a case, the signal processor is operating, as far as the receiving way is concerned, in the same way as described above in reference to FIGS. 3 and 4. Thus, the main process interval always lasts as long as 8 modulation intervals (8/2743 seconds) or 7 basic intervals (7/2400 seconds). Therefore, the scheduler will have always to process 8 receive requests within a main process interval, but only 7 transmit requests within the same interval.

Generally speaking, the parameters values of the transmitting and the receiving ways may be different, such as in a multipoint configuration. For each way, the data rate DR is imposed by the DTE. With n being the number of bits per baud, the modulation rate MR is equal to (DR/n). If TM is the modulation interval corresponding to the modulation rate apparently used by the signal processor, and TB the basic interval corresponding to the basic rate (2400 bauds), the main process interval TP is defined as being the lowest common multiple of TM and TB.

$$TP = m \times TM = q \times TB$$

Since the same signal processing routines are maintained with the invention, the transmit and receive programs (Tx and Rx) must be run every modulation interval. Therefore, the main process interval is divided into m virtual subprocesses (a subprocess every modulation interval) which are monitored by the sampling frequency interrupts. But the modem adapter ignores the modulation rate MR as well as the main process interval TP which are only known by the scheduler and by the programs LIP and DIP. The modem adapter only knows a constant input/output sampling frequency of 14400 Hz and a constant parallel data word input/output rate of 2400 Hz.

Accordingly, it would be possible to have different values for the modulation rate adapted to meet different data word rates. The following table gives the parameters used by the signal processor with data rates of 14400, 16800 and 19200.

| DR (k bit seconds) | MR (bands) | n | TP m | TP q | TP number of bits |
|---|---|---|---|---|---|
| 14.4 | 2,880 | 5 | 6 | 5 | 30 |
| 16.8 | 2,800 | 6 | 7 | 6 | 42 |
| 19.2 | 2,743 | 7 | 8 | 7 | 56 |

Though the invention is preferably implemented by incorporating new software in the signal processor as in the embodiment described hereabove, it is in the skill of the man of the art to understand that a special purpose processor or a hardwired logic apparatus could be implemented using the teachings of the present invention.

We claim:

1. A modem adapted for operating at a modulation rate MR in an environment operating at a basic rate BR, comprising an analog-to-digital converter (14) for converting the analog signals received over a telephone line (12) into digital PCM samples at a frequency FS which is a multiple of said basic rate BR, a signal processor (16) for processing said PCM samples and providing data bits, a serializer-deserializer (18) for receiving parallel data bit words from said signal processor and providing a serial data bit stream to be transmitted at a data rate DR to a data terminal equipment DTE (20) and an adapter (26) which interrupts the signal processor at each sampling pulse at said frequency FS so that said signal processor runs an interrupt program in charge of receiving each PCM sample from said analog-to-digital converter and transmitting a data bit word to said DTE; said modem being characterized in that said signal processor comprises:
    first means (36) for converting a number X of samples received at said frequency FS into a number X times MR/BR of samples before processing said samples by said signal processor whereby said processing results in DR/BR words of DR/MR bits, and second means (38) for converting said DR/BR words of DR/MR bits into DR/MR words of DR/BR bits to be transmitted to said DTE, whereby said adapted modem behaves as a modem operating at a modulation rate MR on a periodic process interval of DR/(BR×MR) seconds.

2. The modem according to claim 1 wherein said first (36) and second (38) converting means are programs which are initiated, as the receive program in charge of processing said PCM samples and providing data bits, when said signal processor (16) is interrupted by said adapter (26).

3. The modem according to claim 1 or 2 wherein said first converting means (36) is a line interface program (LIP) operating as a digital filter receiving samples at said frequency FS and providing samples at a rate FS times MR/BR, said filter having an impulse response sampled at a rate P which is the lowest common multiple to FS and FS times MR/BR, whereby the number of samples X received within said periodic process interval is converted into a number of samples equal to X times m/q.

4. Modem adapted for operating at a modulation rate MR in an environment operating at a basic rate BR, comprising a serializer/deserializer (18) for receiving a serial bit stream at a data rate DR from a data terminal equipment DTE (20) and providing parallel data bit words, a signal processor (16) for processing said data bit words and providing PCM samples, a digital-to-analog converter (22) for converting said PCM samples received at a frequency FS into analog signals to be transmitted over a telephone line (24), and an adapter (26) which interrupts the signal processor at each sampling pulse at said frequency FS so that said signal processor runs an interrupt program in charge of transmitting each PCM sample to said digital-to-analog converter and receiving a data bit word to said DTE; said modem being characterized in that said signal processor comprises: first means (38) for converting DR/MR words of DR/BR bits into DR/BR words of DR/MR bits to be processed by said signal processor (16), and second means (36) for converting x times DR/BR samples provided by said signal processor into x times DR/MR samples to be sent to said digital-to-analog converter, whereby said adapted modem behaves as a modem operating at a modulation rate MR on a periodic process interval of DR/(BR times MR) seconds.

5. The modem according to claim 4 wherein said first (38) and second (36) converting means are programs which are initiated, as the transmit program in charge of processing said parallel data bit words and providing said samples, when said signal processor (16) is interrupted by said adapter (26).

6. The modem according to claim 4 or 5 wherein said second converting means (36) is a line interface program (LIP) operating as a digital filter receiving samples at a rate FS times MR/BR from said signal processor (16) and providing samples at a rate FS, said filter having an impulse response sampled at a rate P which is the lowest common multiple to FS and FS times MR/BR, whereby the number of samples X received within said periodic process interval is converted into a number of samples equal to X times q/m.

7. The modem according to any one of claims 1 to 6 wherein said basic rate BR is equal to 2400 bauds and said sampling frequency FS is equal to 14400 Hz.

* * * * *